US012756051B2

(12) United States Patent
Ruehle et al.

(10) Patent No.: US 12,756,051 B2
(45) Date of Patent: Oct. 6, 2026

(54) BATTERY MODULE, METHOD OF MAKING SAME, AND END PLATE UNIT

(71) Applicant: Robert Bosch GmbH, Stuttgart (DE)

(72) Inventors: Andreas Ruehle, Bietigheim-Bissingen (DE); Ionut Marian Lica, Schwieberdingen (DE); Marius Cichon, Ludwigsburg (DE); Martin Kassner, Weil der Stadt (DE); Walter Jasch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 489 days.

(21) Appl. No.: 18/481,347

(22) Filed: Oct. 5, 2023

(65) Prior Publication Data

US 2024/0136634 A1 Apr. 25, 2024
US 2024/0234912 A9 Jul. 11, 2024

(30) Foreign Application Priority Data

Oct. 21, 2022 (DE) ..................... 10 2022 211 184.2

(51) Int. Cl.
*H01M 50/264* (2021.01)
*H01M 50/209* (2021.01)

(52) U.S. Cl.
CPC ....... *H01M 50/264* (2021.01); *H01M 50/209* (2021.01)

(58) Field of Classification Search
None
See application file for complete search history.

(56) References Cited

U.S. PATENT DOCUMENTS

2018/0034024 A1 2/2018 Chen et al.
2020/0321571 A1 10/2020 Ishikawa

FOREIGN PATENT DOCUMENTS

CN 207743294 U 8/2018
CN 209104220 U * 7/2019 .......... H01M 50/209

* cited by examiner

*Primary Examiner* — Stephan J Essex
(74) *Attorney, Agent, or Firm* — Michael Best & Friedrich LLP

(57) ABSTRACT

A battery module having a plurality of battery cells (2) which are electrically conductively connected to one another in series and/or in parallel and are arranged adjacent to one another in a longitudinal direction (3) of the battery module (1), so that a cell stack (25) is formed. An end plate unit (4) is arranged adjacent to a terminally arranged battery cell (21), wherein the end plate unit (4) comprises at least two end plates (5) formed separately from one another, which are each mechanically connected to a same side surface (6) of the terminally arranged battery cell (21).

9 Claims, 1 Drawing Sheet

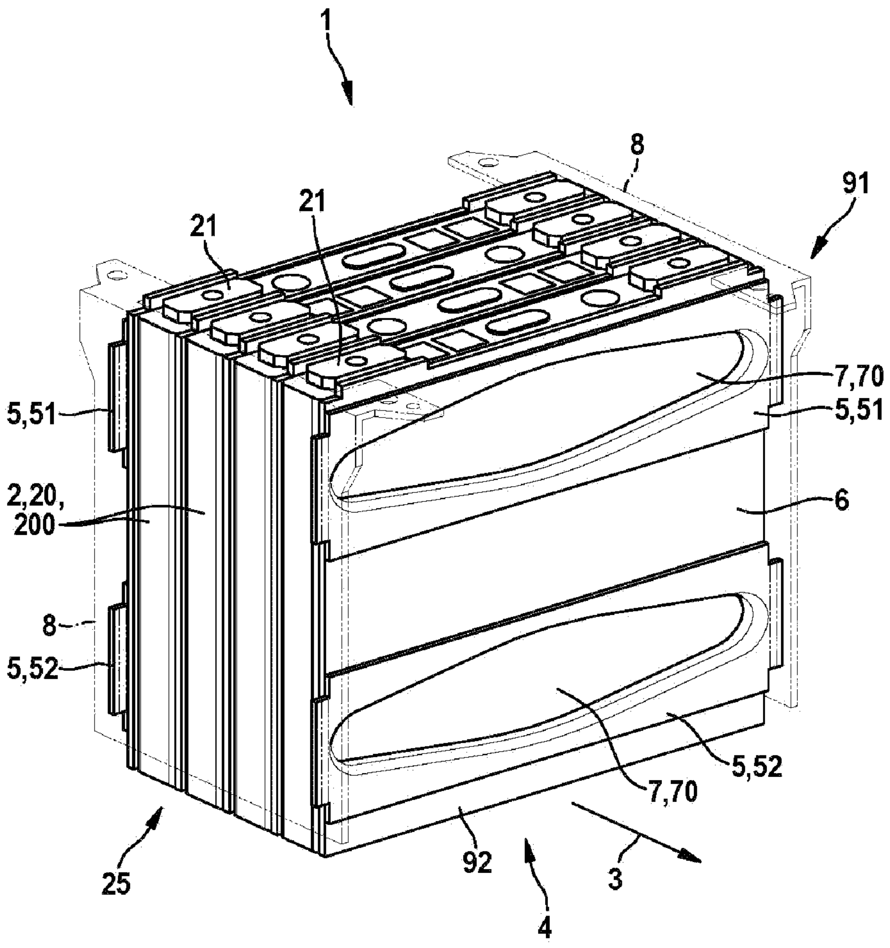
1
8
91
21
21
21
7,70
5,51
5,51
2,20,
200
6
8
5,52
5,52
7,70
25
92
4
3

BATTERY MODULE, METHOD OF MAKING SAME, AND END PLATE UNIT

BACKGROUND

The invention is based on a battery module. It is also an object of the present invention to provide a method of making a battery module and an end plate assembly.

It is known from the prior art that a battery module has a plurality of individual battery cells, each having a positive voltage tap and a negative voltage tap, wherein for an electrically conductive serial and/or parallel connection of the plurality of battery cells to one another, the respective voltage taps are electrically conductively connected to one another and can thus be interconnected to form the battery module. In particular, the battery cells can each comprise a first voltage tap, in particular a positive voltage tap, and a second voltage tap, in particular a negative voltage tap, which taps are electroconductively connected to one another by means of cell connectors so that an electroconductive serial and/or parallel circuitry is formed. Battery modules are themselves in turn interconnected into batteries or entire battery systems.

Furthermore, the plurality of battery cells can form a so-called cell stack and preferably be mechanically braced together. Advantageously, the plurality of battery cells is accommodated between two end plates arranged at the ends, which thus limit the cell stack.

Prior art publications on this subject include CN 207 743 294 U or US 2018/034 024.

SUMMARY

A battery module having the features of the disclosure offers the advantage that a reliable mechanical arrangement of a plurality of battery cells with respect to each other can be formed. In particular, subdividing an end plate unit into end plates designed separately from one another offers the particular advantage that comparably smaller components can be arranged exclusively in areas of the battery module's force path that are relevant to a force transmission.

According to the present invention, a battery module with a plurality of battery cells is provided for this purpose. In this context, the battery cells are in particular designed as lithium-ion battery cells. Furthermore, the battery cells are electroconductively connected serially and/or in parallel to each other. In addition, the battery cells are arranged adjacent to each other in a longitudinal direction of the battery module. Hereby a so-called cell stack is formed by the plurality of battery cells.

An end plate unit is arranged adjacent to a terminally arranged battery cell. The end plate unit thus limits the cell stack in the longitudinal direction of the battery module.

According to the invention, the end plate unit comprises at least two end plates formed separately from each other, each of which is mechanically connected to a same side surface of the terminally arranged battery cell.

Advantageous embodiments of and improvements to the apparatus specified in the independent claim are made possible by the measures specified in the dependent claims.

Compared with previously known solutions, in which the dimensions of a single end plate are based on a size of a respective battery cell, a subdivision of the end plate unit into separately formed end plates can in principle provide smaller component dimensions, whereby a reduction in the overall weight of the battery module can contribute to lightweight construction and whereby a reduction in the use of materials can contribute to a reduction in costs and to an increase in the efficiency of logistics. With a solution according to the invention, it is thus possible overall to reliably absorb cell forces that occur.

Furthermore, a contact area between the individual end plates and the terminally arranged battery cell is also reduced, so that a risk of any damage that may occur due to particles being pressed in is reduced.

Between two battery cells arranged adjacent to each other, an additional spacer element can preferably be arranged in each case. In particular, such spacer element is accordingly arranged adjacent to the respective largest side surfaces of the battery cells between which the spacer element is arranged. In particular, such spacer elements can prevent direct contact between the battery cells arranged adjacent to each other and thus form a defined distance between such battery cells. Through this, thermal insulation and/or electrical insulation can be formed.

Furthermore, a spacer element can also be arranged between the terminal battery cell and the end plate unit.

It should be noted at this point that a mechanical connection of the end plates to a side surface of the terminally arranged battery cell can comprise, on the one hand, a direct mechanical connection by means of a direct contact between the end plate of the end plate unit and the side surface and, on the other hand, can also comprise an indirect mechanical connection in which a spacer element or a compensating element is additionally arranged between the end plate of the end plate unit and the side surface of the battery cell.

It is convenient if the battery cells are each designed as prismatic battery cells. At this point it should be noted that prismatically formed battery cells each comprise a battery cell housing having a total of six side surfaces, which are arranged in pairs opposite each other and substantially parallel to each other. In addition, lateral surfaces arranged adjacent one another are arranged perpendicular to one another. The electrochemical components of the respective battery cell are housed in the interior of the battery cell housing. Typically, two voltage taps, in particular a positive voltage tap and a negative voltage tap, are arranged on a top side surface, which is referred to as the cover surface. The lower side surface opposite the upper side surface is referred to as the bottom surface.

Furthermore, it should be noted that when the battery cells are arranged next to each other in a longitudinal direction of the battery module, the battery cells are arranged adjacent to each other with their respective largest side surfaces, which are each arranged in particular at right angles to the upper side surface and the lower side surface. It should at this point be noted that the longitudinal direction of the battery module is in this case accordingly arranged perpendicular to the largest side surfaces of the battery cells. In particular, the end plate unit is thus arranged here on a largest side surface of the terminally arranged battery cell.

It is advantageous if the plurality of battery cells are mechanically braced together. In particular, the end plate unit is connected to at least one clamping element. In this case, the at least two end plates of the end plate unit are preferably arranged in the force direction of a force caused by an operation of the plurality of battery cells such that the end plates of the end plate unit can apply a counterforce to this force. This can provide reliable mechanical bracing of the plurality of battery cells to each other.

An end plate unit is conveniently arranged on both sides of the cell stack adjacent to a terminal battery cell. In other words, this means that the cell stack of the plurality of battery cells is arranged between the two end plate units.

It is also particularly preferred if the end plate is at least partially designed as a spring element. In other words, this means that an end plate comprises at least one elastically and/or plastically deformable region which can exert a preferably elastic force on the terminally arranged battery cell. By dividing the end plate unit into separately formed end plates, it is possible to form a spring characteristic to the requirements for force absorption. In particular, comparably more complex geometries can be provided here.

It is convenient if the end plate assembly comprises a first end plate and a second end plate. Here, the first end plate of the end plate unit is arranged at an upper end of the terminal battery cell, and the second end plate of the end plate unit is arranged at a lower end of the terminal battery cell.

It is also an object of the present invention to provide a method for manufacturing a battery module, in particular a battery module according to the invention just described. The battery module comprises a plurality of battery cells, in particular lithium-ion battery cells, which are electrically connected in series and/or in parallel. In this case, the battery cells are arranged adjacent to each other in a longitudinal direction of the battery module so that a cell stack is formed. An end plate unit is further arranged adjacent to a terminal battery cell. The end plate unit comprises at least two end plates designed separately from each other, each of which is mechanically connected to the same side surface of the battery cell arranged at the end.

Furthermore, it is also an object of the present invention to provide an end plate unit which is, in particular, an end plate unit of a battery module just described according to the invention. The end plate unit comprises at least two end plates designed separately from each other, each of which is designed to be mechanically connected to a same side surface of a battery cell of a battery module arranged at the end.

BRIEF DESCRIPTION OF THE DRAWINGS

Exemplary embodiments of the invention are illustrated in the drawings and explained in greater detail in the subsequent description.

The FIGURES show:

FIG. 1 a perspective view of an embodiment of a battery module according to the invention,

DETAILED DESCRIPTION

The battery module 1 comprises a plurality of battery cells 2, which are in particular each designed as lithium-ion battery cells 200. According to the exemplary embodiment shown in FIG. 1, the battery cells 2 are each formed as prismatic battery cells 20.

Furthermore, the battery cells 2 are electroconductively connected serially and/or in parallel to each other. In particular, cell connectors not shown in FIG. 1 can be used for this purpose.

An end plate unit 4 is arranged adjacent to a terminal battery cell 21. The end plate unit 4 comprises at least two separately formed end plates 5. These at least two end plates 5 of an end plate unit 4, which are formed separately from each other, are each mechanically connected to a same side surface 6 of a battery cell 21 arranged at the end. In particular, an end plate assembly includes a first end plate 51 and a second end plate 52. In this case, the first end plate 51 of the end plate unit 4 is arranged at an upper end 91 of the end-mounted battery cell 21. In this regard, the second end plate 52 of the end plate unit 4 is arranged at a lower end 92 of the terminally arranged battery cell 22.

In particular, an end plate unit 4 is arranged on both sides of the cell stack 25 in each case adjacent to a respective battery cell 21 arranged at the end. In this regard, it can be seen in FIG. 1 that the plurality of battery cells 2 are arranged between the two end plate units 4.

At this point, it should be noted that the battery module 1 accordingly has a total of 4 end plates 5, with two end plates 5 arranged at each of the two respective ends of the cell stack 25.

In addition, the battery cells 2 are arranged adjacent to each other in a longitudinal direction 3 of the battery module 1. In this case, the plurality of battery cells 2 are mechanically braced together. For this purpose, according to the exemplary embodiment shown in FIG. 1, the end plate unit 4 clamping elements 8 can be connected.

In particular, the plurality of battery cells 2 hereby collectively form a cell stack 25.

Furthermore, it can be seen in FIG. 1 that an end plate 5 is at least partially formed as a spring element 7. For this purpose, the end plate 5 can have an elastically deformable area 70, for example.

The invention claimed is:

1. A battery module having a plurality of battery cells (2) which are electrically conductively connected to one another in series and/or in parallel and are arranged adjacent to one another in a longitudinal direction (3) of the battery module (1), so that a cell stack (25) is formed, wherein an end plate unit (4) is arranged adjacent to a terminally arranged battery cell (21), wherein the end plate unit (4) comprises at least two end plates (5) formed separately from one another, which are each mechanically connected to a same side surface (6) of the terminally arranged battery cell (21) such that a space is provided between the at least two end plates (5).

2. The battery module according to claim 1, wherein the battery cells (2) are each formed as prismatic battery cells (20).

3. The battery module according to claim 1, wherein the plurality of battery cells (2) are mechanically clamped to each other.

4. The battery module according to claim 1, wherein an end plate unit (4) is arranged on both sides of the cell stack (25) in each case adjacent to a battery cell (21) arranged at the end.

5. The battery module according to claim 1, wherein an end plate (5) of the at least two end plates is formed at least partially as a spring element (7).

6. The battery module according to claim 1, wherein a first end plate (51) of the end plate unit (4) is disposed at an upper end (91) of the terminal battery cell (21), and a second end plate (52) of the end plate unit (4) is disposed at a lower end (92) of the terminal battery cell (21).

7. A method for producing a battery module (1) according to claim 1.

8. The battery module according to claim 1, wherein the plurality of battery cells (2) are lithium-ion battery cells (200).

9. The battery module according to claim 3, wherein the end plate unit (4) is connected to a clamping element (8).

* * * * *